(12) United States Patent
Bruce

(10) Patent No.: US 9,621,644 B2
(45) Date of Patent: Apr. 11, 2017

(54) JOINING A DISTRIBUTED DATABASE

(71) Applicant: Axis AB, Lund (SE)

(72) Inventor: Mathias Bruce, Lund (SE)

(73) Assignee: Axis AB, Lund (SE)

( * ) Notice: Subject to any disclaimer, the term of this patent is extended or adjusted under 35 U.S.C. 154(b) by 436 days.

(21) Appl. No.: 14/028,059

(22) Filed: Sep. 16, 2013

(65) Prior Publication Data

US 2015/0081831 A1   Mar. 19, 2015

(51) Int. Cl.
| | | |
|---|---|---|
| *G06F 15/167* | (2006.01) | |
| *H04L 29/08* | (2006.01) | |
| *G06F 9/48* | (2006.01) | |
| *G06F 11/14* | (2006.01) | |
| *G06F 11/18* | (2006.01) | |
| *G06F 17/30* | (2006.01) | |

(52) U.S. Cl.
CPC .......... *H04L 67/104* (2013.01); *G06F 9/4806* (2013.01); *G06F 11/1415* (2013.01); *G06F 11/182* (2013.01); *G06F 17/30206* (2013.01); *G06F 17/30209* (2013.01)

(58) Field of Classification Search
None
See application file for complete search history.

(56) References Cited

U.S. PATENT DOCUMENTS

| | | | |
|---|---|---|---|
| 6,047,332 A | | 4/2000 | Viswanathan et al. |
| 6,243,744 B1 | | 6/2001 | Snaman, Jr. et al. |
| 7,085,805 B1 | * | 8/2006 | Ruberg ................. G06F 9/5055 709/203 |

| | | | |
|---|---|---|---|
| 2009/0063582 A1 | | 3/2009 | Anna et al. |

(Continued)

FOREIGN PATENT DOCUMENTS

WO    2006113434 A2    10/2006

OTHER PUBLICATIONS

Jakob E. Bardram et al: "DOLCAN—Middleware Support for Peer-to-Peer Distributed Shared Objects," Jun. 6, 2007, Distributed Applications and Interoperable Systems, Lecture Notes in Computer Science, Berlin, Heidelberg, pp. 119-132, XP019060786.

(Continued)

*Primary Examiner* — Viet Vu
*Assistant Examiner* — James Edwards
(74) *Attorney, Agent, or Firm* — Snyder, Clark, Lesch & Chung, LLP

(57) ABSTRACT

A method may include a device joining a distributed database in a distributed physical access control system. The method may include storing first data in a first memory area of a memory. The first memory area may be designated to store data for a consensus-based distributed database (DB). The first data is to be added to the consensus-based distributed DB that is distributed among other devices in a network. The method may include copying the first data to a second memory area of the memory of the device and adding the device to the network, receiving data from the other devices in the network and adding the received data to the consensus-based distributed DB by storing the received data in the first memory area, and adding the first data to the consensus-based distributed DB by copying the first data from the second memory area to the first memory area.

20 Claims, 13 Drawing Sheets

(56) References Cited

U.S. PATENT DOCUMENTS

2009/0070571 A1* 3/2009 Neely ................ G07C 9/00134
　　　　　　　　　　　　　　　　　　　　　　　713/1
2009/0080443 A1　　3/2009 Dziadosz
2011/0289344 A1　11/2011 Bae et al.
2013/0124546 A1* 5/2013 Wormley ............. H04L 63/101
　　　　　　　　　　　　　　　　　　　　　　　707/758

OTHER PUBLICATIONS

Ted Wobber et al: "Policy-Based Access Control for Peer-to-Peer Replication," Microsoft Research, Silicon Valley, Aug. 15, 2008, XP055042564, Retrieved from the Internet: URL: http://research.microsoft.com/pubs/79654/submitted-final.pdf on Oct. 29, 2012, 10 pages.

European Search Report, dated Feb. 18, 2014, issued in European Application No. EP 13 18 5578.5, 11 pages.

* cited by examiner

… (1)

JOINING A DISTRIBUTED DATABASE

FIELD

This disclosure relates to a device joining a distributed database in a distributed physical access control system and, more generally, to a device joining a distributed database.

BACKGROUND INFORMATION

Access control systems may be used to control physical access to a facility. An access control system (as well as other types of control systems) may have numerous controllers, each controlling a different part of the system. Each controller may store device-specific information, such as configuration information, peripheral settings, etc.

SUMMARY

In one embodiment, a method may include storing first data in a first memory area of a memory of a device. The first memory area may be designated to store data for a consensus-based distributed database (DB). The first data is to be added to the consensus-based distributed DB that is distributed among other devices in a peer-to-peer network. The method may include copying the first data to a second memory area of the memory of the device and adding the device to the peer-to-peer network after copying the first data to the second memory area. The method may further include receiving data from the other devices in the peer-to-peer network and adding the received data to the consensus-based distributed DB by storing the received data in the first memory area. The method may include adding the first data to the consensus-based distributed DB by copying the first data from the second memory area to the first memory area after adding the device to the peer-to-peer network. Further, the method may include distributing the first data to the other peer-to-peer network devices in the peer-to-peer network as part of the consensus-based distributed DB.

In this embodiment, the first data may include device-specific data and the second memory area may be designated to store data for a non-consensus-based DB. The device-specific data may include configuration data of a controller in a distributed control system. The configuration data may include data defining peripherals connected to the controller.

In this embodiment, the device may include a controller in a distributed physical access control system (DPACS). The other devices may include other controllers in the DPACS. In this embodiment, the first data may include data for configuring the controller.

In another embodiment, a method may include storing a consensus-based distributed DB in a first memory area of a memory in a device. The device may be connected to a peer-to-peer network that distributes the consensus-based distributed DB among other devices in the peer-to-peer network. The method may include copying first data, stored in the consensus-based distributed DB, to a second memory area of the memory of the device and removing the device from the peer-to-peer network after copying the first data to the second memory area. The method may include deleting data in the consensus-based distributed DB after copying the first data to the second memory area and after removing the device from the peer-to-peer network. The method may include copying the first data from the second memory area to the consensus-based distributed DB after deleting the data in the consensus-based distributed DB.

In this embodiment, the first data may include device-specific data and the second memory area may be designated to store data for a non-consensus-based DB. Further, the device-specific data may include configuration information of a controller in a distributed control system. In this embodiment, the configuration data may include data defining peripherals connected to the controller. Further, the device may be a controller in a DPACS, and the other devices may include other controllers in the DPACS. In this embodiment, the first data may include data for configuring the controller.

In another embodiment, a device may include a first memory area of a memory of the device to store data for a consensus-based distributed DB. The first data is to be added to the consensus-based distributed DB that is distributed among other devices in a peer-to-peer network. The device may include a processor to copy the first data to a second memory area of the memory of the device and add the device to the peer-to-peer network after the copying of the first data to the second memory area. The device may also include a receiver to receive data from the other devices in the peer-to-peer network. Further the processor may be configured to add the received data to the consensus-based distributed DB by storing the received data in the first memory area, and to add the first data to the consensus-based distributed DB by copying the first data from the second memory area to the first memory area after adding the device to the peer-to-peer network. The device may include a transmitter to transmit the first data to the other devices in the peer-to-peer network as part of the consensus-based distributed DB.

In this embodiment, the first data may include device-specific data and the second memory area may be designated to store data for a non-consensus-based DB. The device-specific data may include configuration data of a controller in a distributed control system. The device-specific data may include data defining peripherals connected to the controller.

In this embodiment, the device may include a controller in a DPACS and the other devices may include other controllers in the DPACS. In this embodiment, the first data may include data for configuring the controller.

In another embodiment, a device may include a first memory area of a memory in a device to store a consensus-based distributed DB. The device may be connected to a peer-to-peer network that distributes the consensus-based distributed DB among other devices in the peer-to-peer network. The device may include a processor to copy first data, stored in the consensus-based distributed DB, to a second memory area of the memory of the device. The processor may be configured to remove the device from the peer-to-peer network after copying the first data to the second memory area. The processor may be configured to delete data in the consensus-based distributed DB after copying the first data to the second memory area and after removing the device from the peer-to-peer network. The processor may be configured to copy the first data from the second memory area to the consensus-based distributed DB after deleting the data in the consensus-based distributed DB.

In this embodiment, the first data may include device-specific data and the second memory area may be designated to store data for a non-consensus-based DB. The device-specific data may include configuration information of a controller in a distributed control system. The data for configuring the controller may include data defining peripherals connected to the controller.

In this embodiment, the device may include a controller in a DPACS and the other devices may include other controllers in the DPACS. In this embodiment, the first data may include data for configuring the controller.

Other embodiments are described below. That is, the embodiments described above are only provided as examples.

DETAILED DESCRIPTION OF EMBODIMENTS

The following detailed description refers to the accompanying drawings. The same reference numbers in different drawings identify the same or similar elements.

One embodiment described below relates to controllers in a physical access control systems (PACS). Other embodiments may include devices or systems other than a PACS, such as controllers in systems for controlling different applications within building management, monitoring, and security systems. One embodiment may include controllers in a home automation system, for example.

As mentioned above, a control system may have numerous controllers, each controlling a different part of the system. Each controller may store device-specific data, such as configuration data, peripheral settings, etc. If this device-specific data is stored in a distributed manner in, for example, a consensus-based database, then this device-specific data may be removed, deleted, or overwritten when the corresponding controller joins a new or different network of other controllers distributing the consensus-based database. In one embodiment described below, device-specific information may be retained and introduced into the consensus-based database (in such a way to avoid the loss of some device-specific data) when a controller joins the consensus-based database.

Likewise, if the device-specific data is stored in a distributed manner in, for example, a consensus-based database, then this device-specific data may be removed, deleted, or overwritten when the corresponding controller leaves a network of controllers distributing the consensus-based database. In one embodiment described below, device-specific information may be retained and reintroduced into the consensus-based database when a controller leaves the consensus-based database.

One or more embodiments below relate to a device joining a distributed database in a distributed physical access control system. As described below, other embodiments related to joining a distributed database in other types of systems (e.g., other than a physical access control system).

Figure 1:
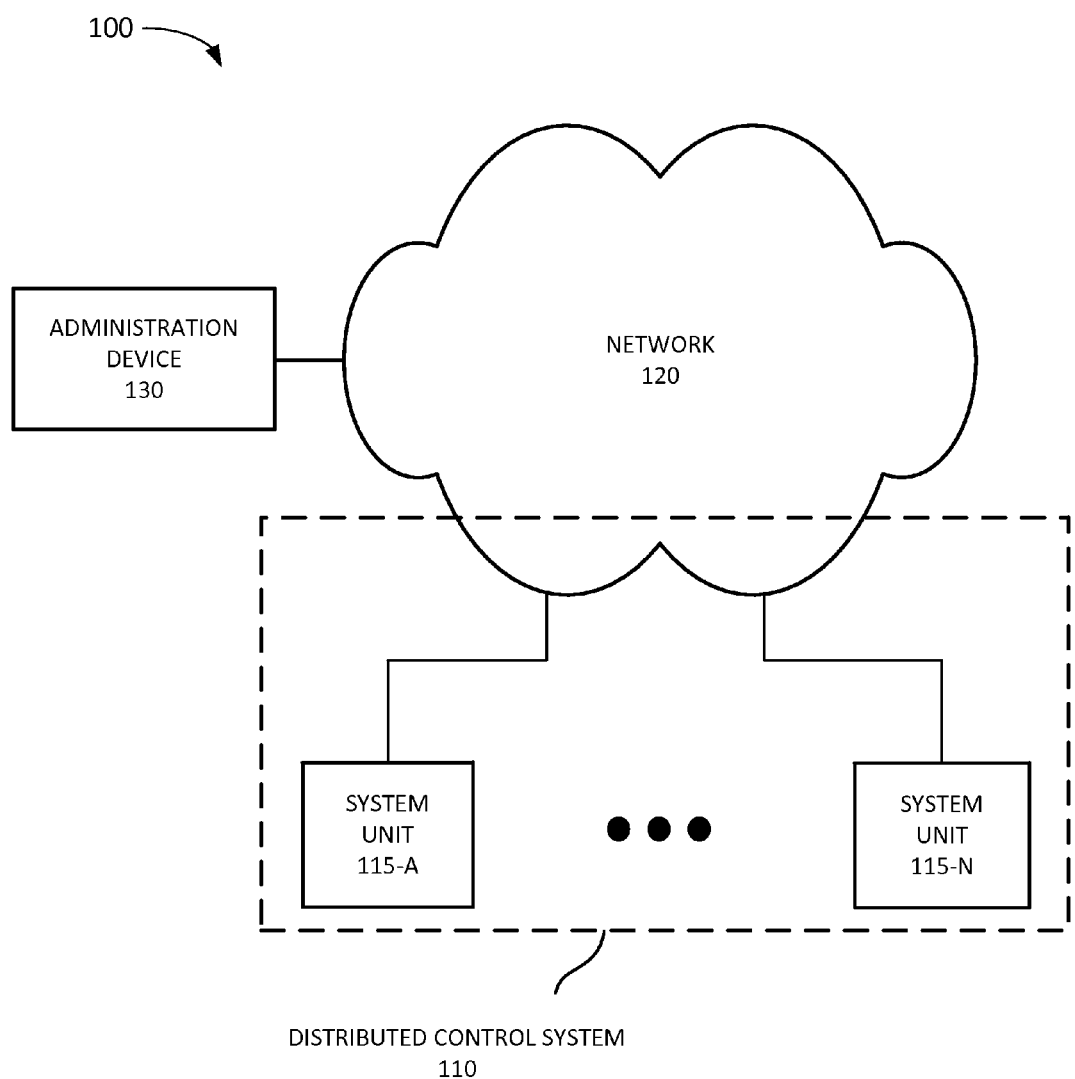
FIG. 1 is a block diagram illustrating an exemplary environment according to an embodiment described herein.

FIG. 1 is a block diagram of an exemplary environment 100 in which the systems and methods described below may be implemented. As shown in FIG. 1, environment 100 may include a distributed control system 110 (e.g., a distributed physical access control system), a network 120, and an administration device 130.

Distributed control system 110 may include a distributed computing system that includes system units 115-A to 115-N (referred to collectively as "system units 115" or "units 115," and individually as "unit 115"). In one embodiment, system unit 115 includes a physical access control device. For example, system unit 115 may include a controller that controls access to a secure area, such as a room or a group of rooms. System unit 115 may receive credentials (e.g., access card credentials) via a reader device and may determine whether the credentials are authentic and associated with authority to access the secure area. If so, the controller may issue a command to open a lock on a door or perform other operations associated with granting access to the secure area.

Distributed control system 110 may include one or more distributed datasets. A distributed dataset includes data that is stored in a distributed (and potentially redundant) fashion in system units 115 that are associated with the distributed dataset. In one embodiment, distributed datasets are replicated on more than one device. For example, the entire distributed dataset may be stored in all the units 115. In another embodiment, one or more units 115 may store a subset of the distributed dataset. Also, a distributed dataset may be associated with all system units 115 or may be associated with a subset of system units 115.

In one embodiment, units 115 may reach a consensus in order to effect a change in the distributed dataset (e.g., a consensus-based distributed database). System unit 115 may propose a change to a consensus-based distributed dataset. If the change is accepted by a quorum of units 115 associated with the distributed dataset, units 115 may reach a consensus and propagate the change to each local copy of the distributed dataset in each associated unit 115. That is, a consensus with respect to a change in the distributed dataset may be reached if a quorum of the associated units 115 votes for the change.

In this context, a quorum may correspond to the smallest majority of the associated units 115. For example, if a distributed dataset is associated with N units 115, a quorum may be reached if $N/2+1$ associated units 115 vote for the change and N is an even number, or if $(N-1)/2+1$ associated units 115 votes for the change and N is an odd number. Requiring a smallest majority to reach a quorum may ensure that when considering two conflicting proposals, at least one system unit 115 receives both proposals and selects one of the proposals for consensus.

A consensus-based distributed dataset may ensure that any system unit 115 associated with the distributed dataset includes the information (e.g., all the information in one embodiment) managed by the distributed dataset. For example, a distributed dataset may include access rules and the access rules may be available to any system unit 115 associated with the distributed dataset. Thus, as a result of the one or more distributed datasets, in one embodiment, control system 110 may correspond to a decentralized system with no central controlling device, such as a server device. In other embodiments, control system 110 may include both a decentralized system and a central controlling device (such as a server device). Changes to control system 110 may be configured at any system unit 115 and if the change is associated with a distributed dataset, the change may be propagated to other system units 115 associated with the distributed dataset. Furthermore, control system 110 may exhibit robustness with respect to device failure, as a single point of failure may be avoided. For example, if a particular system unit 115 fails, the other units 115 may continue to operate without loss of data (or with the minimization of loss of data). In another embodiment, a change may be made to the distributed dataset without consensus.

Network 120 may enable units 115 to communicate with each other and/or may enable administration device 130 to communicate with particular units 115. Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

Administration device 130 allows an administrator to connect to a particular unit 115 in order to configure control system 110, change a configuration of control system 110, receive information from control system 110, and/or otherwise administer control system 110. Administration device 130 may include any device configured for communicating with one or more of units 115. For example, administration device 130 may include a portable communication device (e.g., a mobile phone, a smart phone, a phablet device, a global positioning system (GPS) device, and/or another type of wireless device); a personal computer or workstation; a server device; a laptop, tablet, or another type of portable computer; and/or any type of device with communication capability. In one embodiment, administration device 130 may be part of unit 115. As such, an administrator may administer control system 110 from one or more of units 115.

Although FIG. 1 shows exemplary components of environment 100, in other implementations, environment 100 may include fewer components, different components, differently arranged components, or additional components than depicted in FIG. 1. Additionally or alternatively, any one device in environment 100 (or any group of devices) may perform functions described as performed by one or more other devices in environment 100.

Figure 2A:
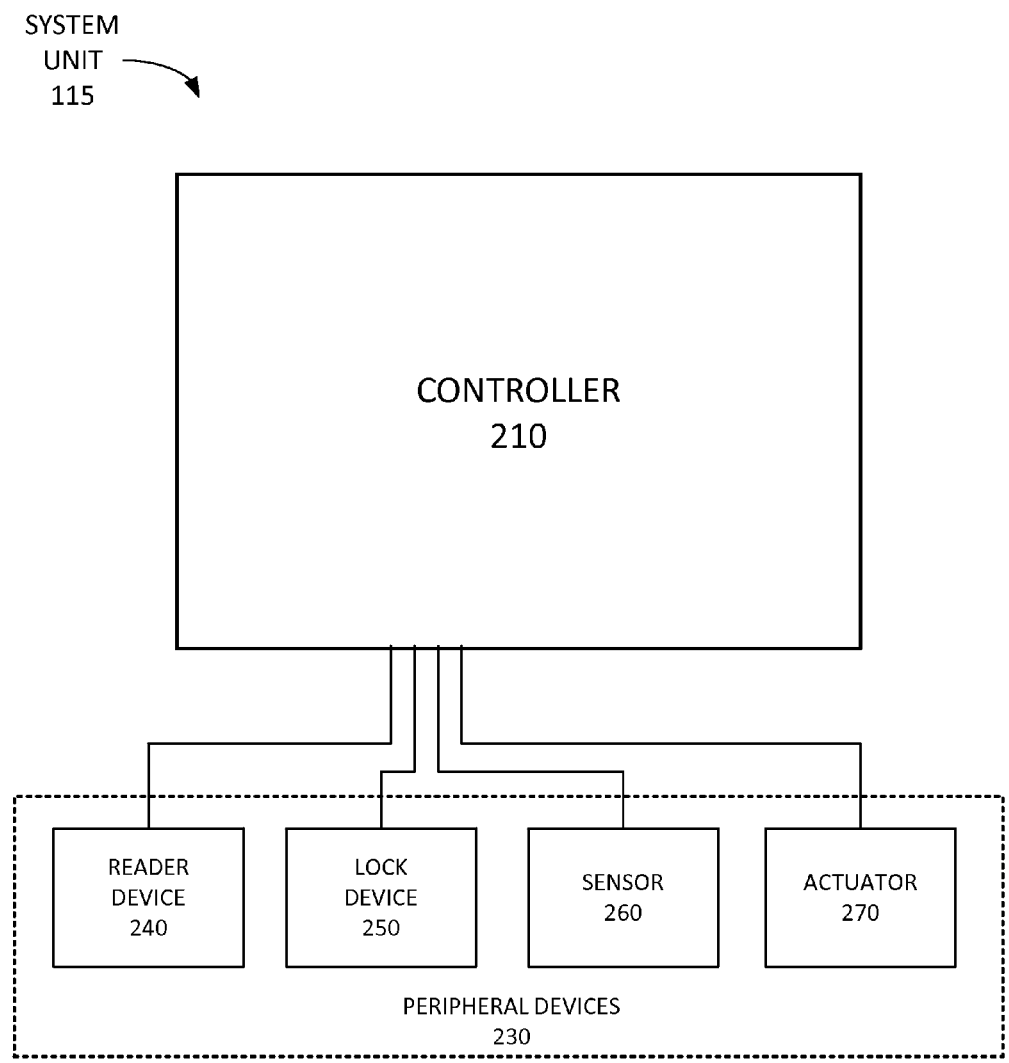
FIGS. 2A and 2B are block diagrams illustrating exemplary components of the system unit of FIG. 1.
Figure 2B:
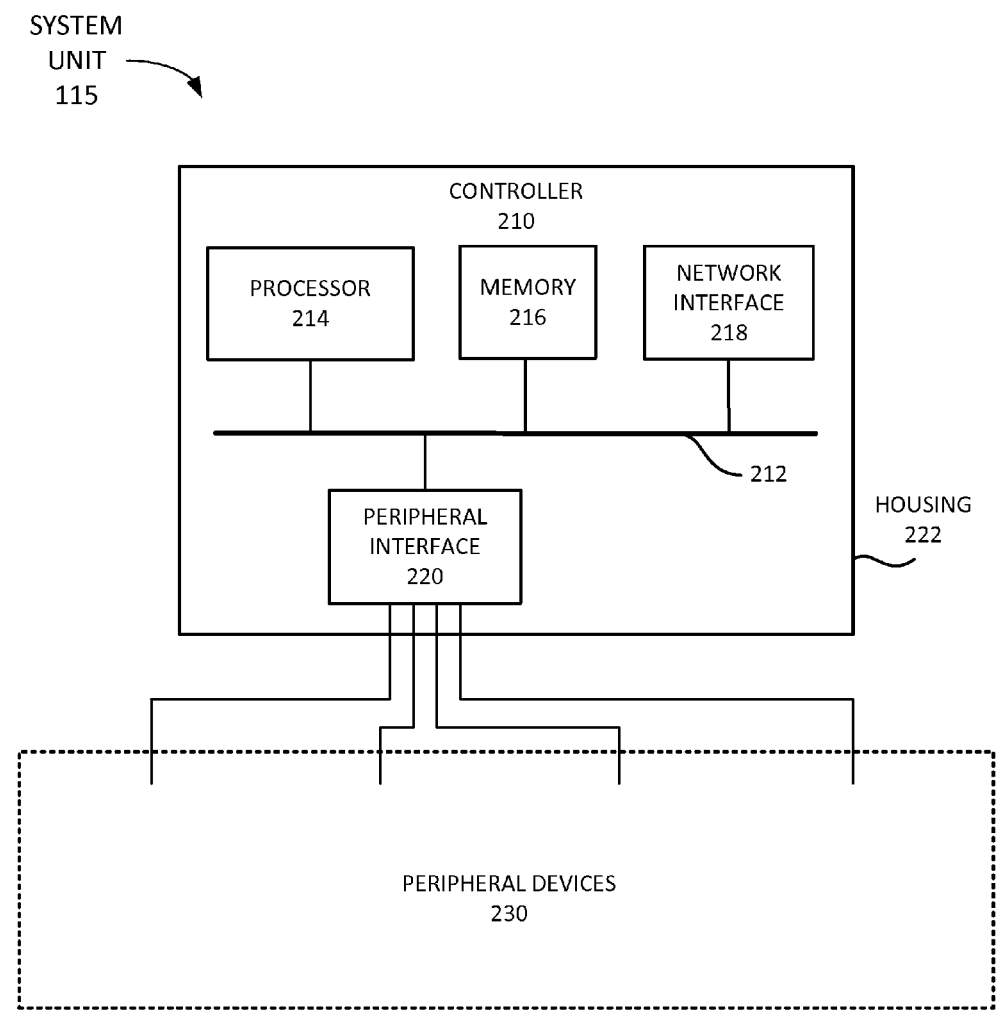

FIGS. 2A and 2B are block diagrams illustrating exemplary components of a unit 115. As shown in FIG. 2A, unit 115 may include a controller 210 and one or more peripheral devices 230. Controller 210 may control the operation of unit 115, may communicate with other units 115, may communicate with administration device 130, and/or may control peripheral devices 230. Peripheral devices 230 may include devices that provide information to controller 210, that are controlled by controller 210, and/or that otherwise communicate with controller 210. In one embodiment, peripheral devices 230 may include any type of security device. For example, peripheral devices 230 may include a security devices such as a reader device 240, a lock device 250, a sensor 260 (e.g., a camera), and/or an actuator 270.

As shown in FIG. 2B, controller 210 may include a bus 212, a processor 214, a memory 216, a network interface 218, a peripheral interface 220, and a housing 222. Bus 212 includes a path that permits communication among the components of controller 210. Processor 214 may include any type of single-core processor, multi-core processor, microprocessor, latch-based processor, and/or processing logic (or families of processors, microprocessors, and/or processing logics) that interprets and executes instructions. In other embodiments, processor 214 may include an application-specific integrated circuit (ASIC), a field-programmable gate array (FPGA), and/or another type of integrated circuit or processing logic.

Memory 216 stores information, data, and/or instructions. Memory 216 may include any type of dynamic, volatile, and/or non-volatile storage device. Memory 216 may store instructions, for execution by processor 214, or information for use by processor 214. For example, memory 216 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Network interface 218 may include a transceiver (e.g., a transmitter and/or a receiver) that enables controller 210 to communicate (e.g., transmit and/or receive data) with other devices and/or systems via wired communication links (e.g., conductive wire, twisted pair cable, coaxial cable, transmission line, fiber optic cable, and/or waveguide, etc.), wireless communication links (e.g., radiofrequency, infrared, and/or visual optics, etc.), or a combination of wireless and wired communication links. Network interface 218 may include a transmitter that converts baseband signals to radiofrequency (RF) signals and/or a receiver that converts RF signals to baseband signals. Network interface 218 may be coupled to an antenna for transmitting and receiving RF signals.

Network interface 218 may include a logical component that includes input and/or output ports, input and/or output systems, and/or other input and output components that facilitate the transmission of data to other devices. For example, network interface 218 may include a network interface card (e.g., Ethernet card) for wired communications and/or a wireless network interface (e.g., a WiFi) card for wireless communications. Network interface 218 may also include a universal serial bus (USB) port for communications over a cable, a Bluetooth wireless interface, a radio-frequency identification (RFID) interface, a near-field communications (NFC) wireless interface, and/or any other type of interface that converts data from one form to another form.

Peripheral interface 220 may be configured to communicate with one or more peripheral devices 230. For example, peripheral interface 220 may include one or more logical components that include input and/or output ports, input and/or output systems, and/or other input and output components that facilitate the transmission of data to peripheral devices 230. As an example, peripheral interface 220 may communicate with peripheral devices 230 using a Serial Peripheral Interface Bus protocol (e.g., the Wiegand protocol, and/or the RS-485 protocol). As another example, peripheral interface 220 may use a different type of protocol. In one embodiment, network interface 218 may also act as a peripheral interface for coupling peripherals 230 to controller 210.

Housing 222 may enclose the components of controller 210 and may protect the components of controller 210 from the environment. In one embodiment, housing 222 may include one or more of peripheral devices 230. In another embodiment, housing 222 may include administration device 130. Housing 222 may define the boundaries of one system unit 115 and/or controller 210 from other system units 115 and/or controllers 210 in a multi system unit 115/controller 115 system.

As described below, controller 210 may perform operations relating to distributing user credentials for one or more services on one or more devices. Controller 210 may perform these operations as a result of hardwired circuitry of an ASIC. Controller 210 may also (or alternatively) perform these operations in response to processor 214 executing software instructions contained in a computer-readable medium, such as memory 216. A computer-readable medium may include a non-transitory and/or tangible memory device. Memory 216 may be implemented within a single physical memory device or spread across multiple physical memory devices. The software instructions may be read into memory 216 from another computer-readable medium or from another device. The software instructions contained in memory 216 may cause processor 214 to perform processes described herein. Thus, implementations described herein are not limited to any specific combination of hardware circuitry and software.

Returning to peripheral devices 230, reader device 240 may include a device that reads credentials from a user and provides the credentials to controller 210. For example, reader device 240 may include a keypad configured to receive an alphanumeric personal identification number (PIN) from a user; a card reader to configure a card that stores a card code on a magnetic strip or another type of storage device, such as a radiofrequency identification (RFID) tag; a fingerprint reader configured to read a user's fingerprint; an iris reader configured to read a user's iris; a microphone and a voice signature identifier configured to record a user's voice signature; an NFC reader; a camera that is associated with facial recognition software; a microphone that is associated with voice recognition software; and/or another type of reader device. Reader device 240 may include any type security device that can provide credentials, and may include one or more sensor devices, such any sensor device described below with reference to sensor 260. For example, reader device 240 may include a camera used for facial recognition and/or a microphone used for voice recognition. In this case, the user's voice or face may be used as a credential for authentication.

Lock device 250 may include a lock controlled by controller 210. Lock device 250 may lock a door (e.g., prevent it from opening or closing), a window, an HVAC vent, and/or another type of access opening to a secure area. For example, lock device 250 may include an electromagnetic lock; a mechanical lock with a motor controlled by controller 210; an electromechanical lock; and/or another type of lock.

Sensor 260 may include a sensing device. As examples, sensor 260 may include a door sensor to sense whether a door is open or closed; a visible light monitoring device (e.g., a camera), an infrared (IR) light monitoring device, a heat signature monitoring device, an audio monitoring device (e.g., a microphone), and/or another type of monitoring device; an alarm sensor, such as a motion sensor, a heat sensor, a pressure sensor, and/or another type of alarm sensor; a tamper sensor, such as a position sensor located inside unit 115; and/or a "request to exit" button located within a secured area associated with unit 115; and/or another type of sensor device. In the examples below, sensor 260 may be referred to as "camera 260."

Actuator 270 may include an actuator device. As an example, actuator 270 may control an illumination device. As other examples, actuator 270 may include a burglar alarm activator; a speaker to play messages or generate alarm signals; a display device; a motor to move sensor 260 (e.g., control the field of view of a camera or other monitoring device); a motor for opening/closing a door, window, HVAC vent, and/or another opening associated with a secure area; a motor to secure lock device 250 in a locked or unlocked position; a fire extinguishing device; and/or another type of actuator device.

Although FIGS. 2A and 2B show exemplary components of unit 115, in other implementations, unit 115 may include fewer components, different components, additional components, or differently arranged components than depicted in FIGS. 2A and 2B. For example, although a single reader device 240, a single lock device 250, a single sensor 260, and a single actuator 270 are shown in FIG. 2A, in practice, peripheral devices 230 may include multiple reader devices 240, multiple lock devices 250, multiple sensors 260, and/or multiple actuators 270. Peripheral devices 230 may also not include one or more of the devices shown in FIG. 2A. Additionally or alternatively, any component of unit 115 (or any group of components) may perform the task or tasks described as performed by one or more other components of unit 115.

Further, although exemplary distributed control system 110 includes a physical access distributed control system, other implementations may control systems other than physical access. On the other hand, distributed control system 110 may include any type of physical access control systems (e.g., in an operational environment), such as a control system for opening and/or closing a door or controlling physical access to a building or facility. Distributed control system 110 may also include a system to control a fan (e.g., start or stop), to initiate an alarm in a building management system (e.g., failed authentication, successful authentication, etc.), or to control a robot arm in an industrial automation system.

Figure 3A:
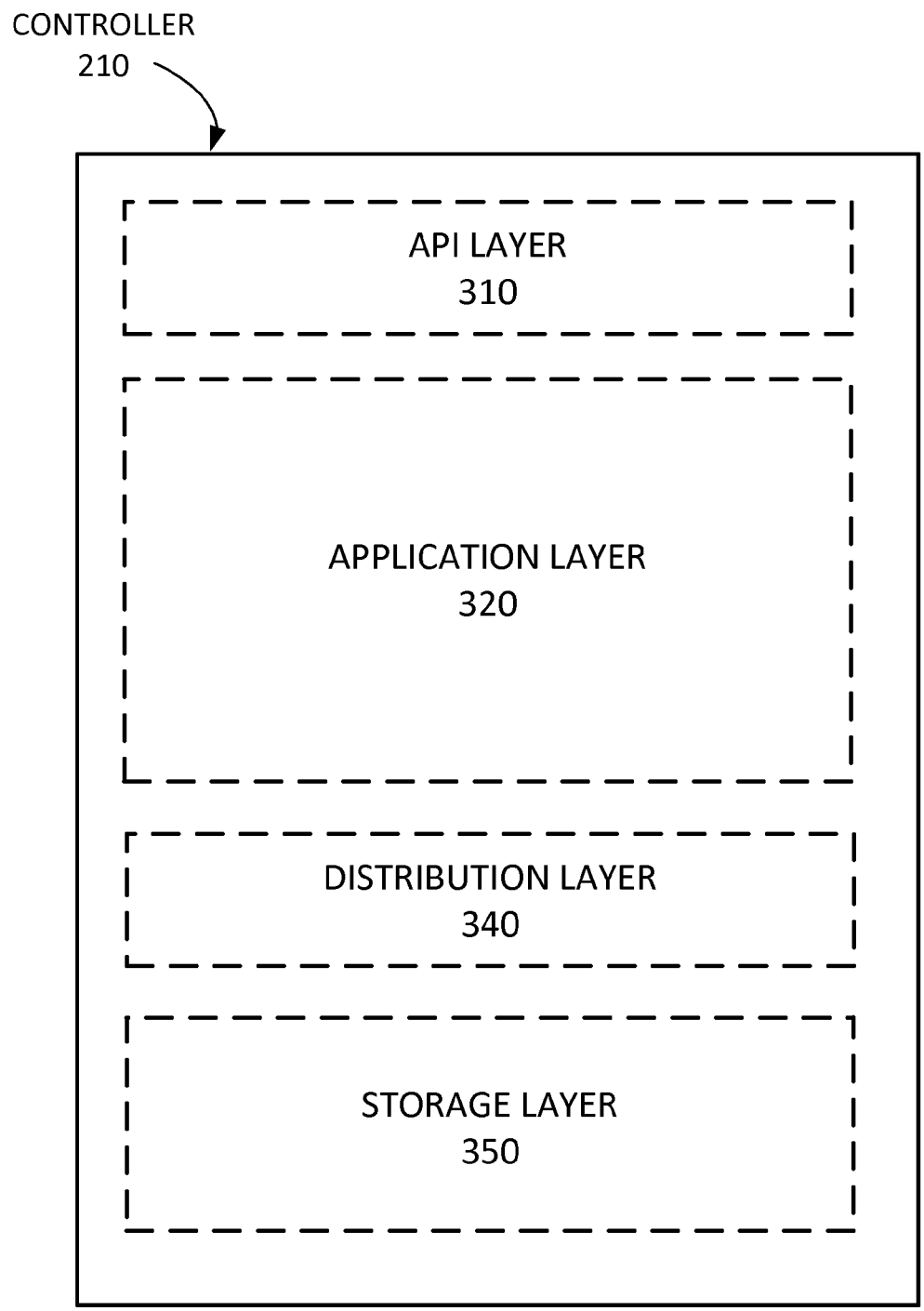
FIGS. 3A and 3B are block diagrams illustrating functional components of the system unit of FIG. 1 in one embodiment.

FIG. 3A is a block diagram illustrating exemplary functional layers of system unit 115. As shown in FIG. 3A, unit 115 may include an application program interface (API) layer 310, an application layer 320, a distribution layer 340, and a storage layer 350.

API layer 310 includes an API configured to communicate, e.g., with administration device 130. When an administrator uses administrator device 130 to log into unit 115, API layer 310 may communicate with administrator device 130 to authenticate the administrator. As another example, API layer 310 may communicate with administrator device 130 to change a configuration of unit 115. API layer 310 may receive data from administrator device 130 and provide the data to distribution layer 340 and/or to storage layer 350. API layer 310 may also communicate with administrator device 130 to install an application in application layer 320. API layer 310 may be configured to handle different administrator types. For example, API layer 310 may include an API to handle a Web Services administrator, a Linux administrator, an Open Network Video Interface Forum (ONVIF) administrator, and/or another type of API.

Application layer 320 may include one or more applications installed on unit 115. Applications may include a control logic application, a door control application to open and close doors, a reader control application to receive user credentials, among other applications. Applications are discussed in more detail with respect to FIG. 3B.

Distribution layer 340 may manage one or more distributed datasets associated with units 115. For example, distribution layer 340 may connect controllers 210 in a peer-to-peer network for the distribution of datasets. Distribution layer 340 may use a protocol (e.g., a PAXOS protocol) to establish a consensus with respect to a change in a particular consensus-based distributed dataset. As an example, distribution layer 340 may send a proposal for a change to other system units 115 associated with the distributed dataset and may receive a quorum for the change from the other system units 115. As another example, distribution layer 340 may vote for a proposal received from another unit 115. As yet another example, distribution layer 340 may receive an indication that a consensus has been reached for a change without having voted for the change. When an indication of consensus for a change is received, distribution layer 340 may make the change in the local copy of the distributed dataset. Distribution layer 340 may maintain secure connections with other units 115 over network 120. (e.g., a Transport Layer Security (TLS) connection).

Storage layer 350 may store one or more datasets associated with unit 115. A dataset stored in storage layer 350 may correspond to a local dataset or may correspond to a distributed dataset. A local dataset may store information associated with (and/or only associated with) the particular unit 115 that stores the local dataset. A distributed dataset may store information that is distributed among other system units 115 associated with the distributed dataset.

Figure 3B:
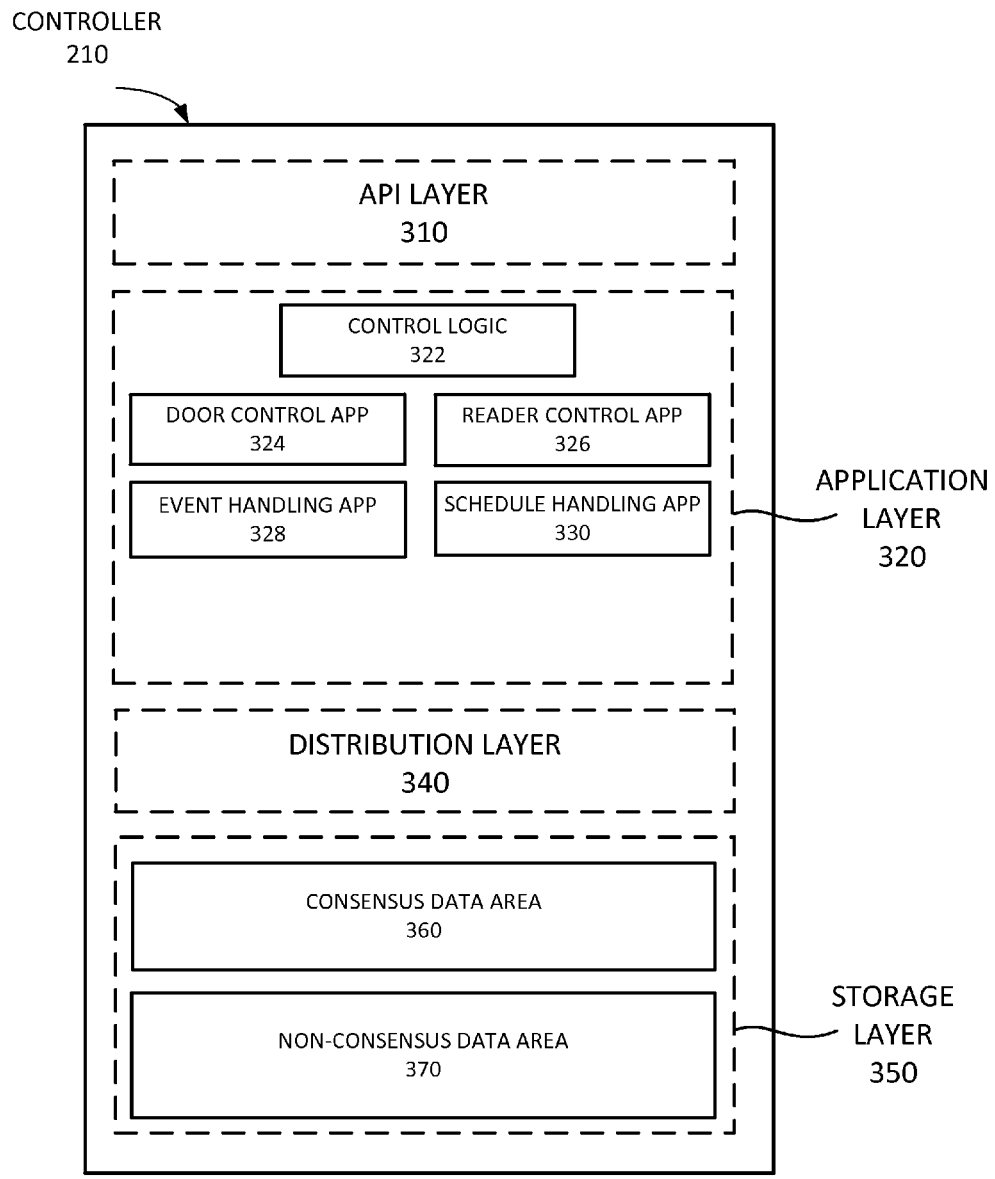

FIG. 3B is a block diagram of exemplary functional components of controller 210, with more detail provided for application layer 320 and storage layer 350. As shown in FIG. 3B, application layer 320 may include a control logic application 322 (or "control logic 322"), a door control application 324, a reader control application 326, an event handling application 328, and/or a schedule handling application 330. Other applications may include, for example, alarm and control applications.

Control logic 322 may determine whether to grant physical access to a user based on received credentials and based on stored access rules. Control logic 322 may also grant access (e.g., remote access such as a remote login) based on the determination. As such, control logic 322 may authenticate an administrator based on credentials (e.g., a username and password), allow the administrator to update user credentials (e.g., for other administrators and/or for users who wish to be granted physical access), etc. These functions of control logic 322 are described below with respect to FIG. 3C.

Door control application 324 may control one or more doors and/or associated lock devices 250. For example, door control application 324 may determine whether a door is open or closed and/or locked or unlocked and may operate one or more device to open or close the door and/or to lock or unlock the door. Reader control application 326 may control one or more reader devices 240 and may obtain and process credentials received from the one or more reader devices 240. Event handling application 328 may process events recorded by unit 115, such as door opening events, alarm events, sensor events, and/or other types of logged events. Event handling application 328 may generate a report and/or an alarm and send the report and/or alarm to administrator device 130 (and/or to another designated device, such as other units 115). Schedule handling application 330 may manage one or more schedules associated with unit 115. For example, access rules for particular groups of users may change based on particular times of day.

Storage layer 350 may include a consensus data area 360 and a non-consensus data area 370. In one embodiment, consensus data area 360 may include a distributed consensus-based database; and non-consensus data area 370 may include a database that is not consensus based and/or not distributed (i.e., such as the local dataset described above).

Figure 3C:
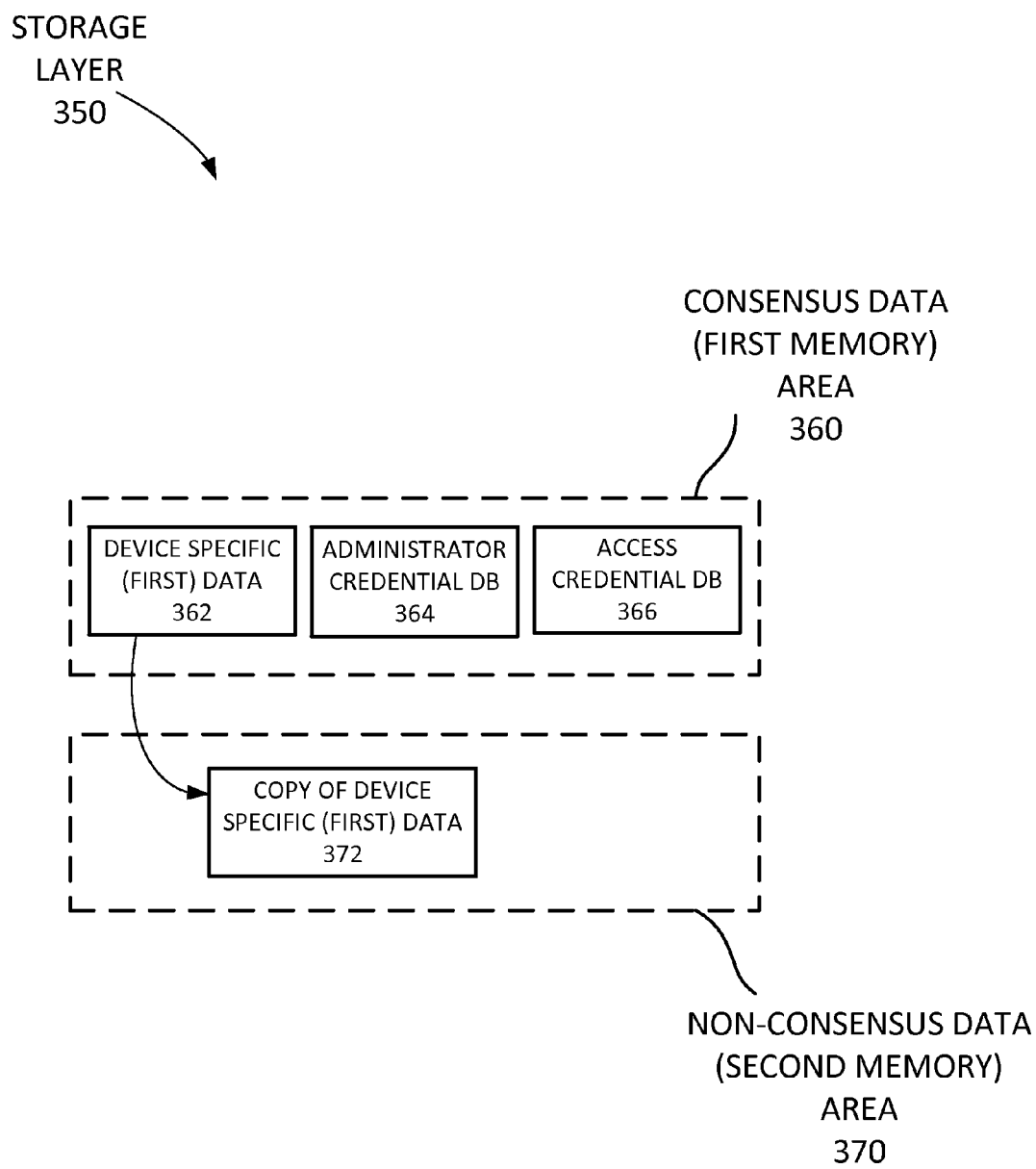
FIG. 3C is a block diagram illustrating functional components of the storage layer of FIG. 3B in one embodiment.

FIG. 3C is a block diagram of exemplary components of storage layer 350. As shown, consensus data area 360 may include device-specific data 362 (or first data 362), administrator credential DB 364, and access credential DB 366. As discussed above, device-specific data 362 may include information associated with a particular unit 115, such as hardware configuration of unit 115 and/or controller 210, peripheral devices 230 connected to controller 210, application installed in application layer 320, or other types of information. In another embodiment, device-specific data 362 may include information that is not necessarily specific or associated with the particular unit 115 (e.g., data 362 may include information associated with more than one unit 115 and/or controller 210). As such, data 362 may also be referred to as "first data 362."

Administrator credential DB 364 may store the credentials (e.g., usernames and passwords) for authenticating users that can administer and/or manage system unit 115 (e.g., with a remote login). In one embodiment, administrator credential DB 364 is distributed among other controllers 210 (e.g., in a consensus-based database) to allow the same administrators to administer system 110 from any of the controllers 210 or units 115.

Access credential DB 366 may store the credentials for users wishing to access a physical area (e.g., card and pin information, fingerprint information, etc.). In one embodiment, data in access credential DB 366 may be distributed (e.g., in a consensus-based distributed database) to other controllers in a network.

Although FIGS. 3A-3C show exemplary functional components of unit 115, in other implementations, unit 115 may include fewer functional components, different functional components, differently arranged functional components, or additional functional components than depicted in FIGS. 3A-3C. Additionally, any one of the components (or any group of components) of unit 115 may perform functions described as performed by one or more other functional components of unit 115. Further, the functional components of unit 115 may be implemented, for example, via hardwired circuitry of one or more ASICs. Additionally or alternatively, the functional components of unit 115 may be implemented by processor 214 executing instructions from memory 216.

Figure 4A:
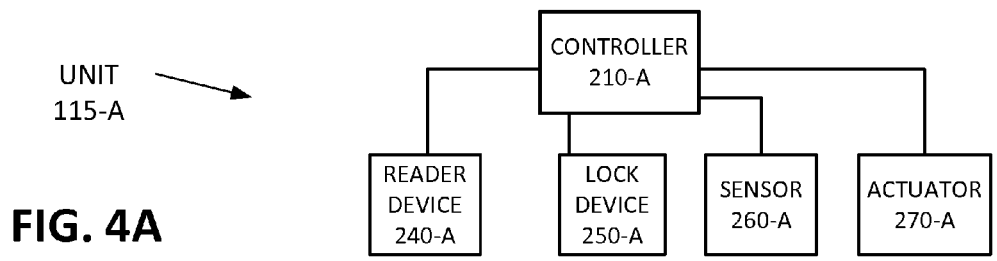
FIG. 4A is a is a block diagram illustrating an exemplary system unit in one configuration.

FIG. 4A is a is a block diagram illustrating system unit 115-A in one configuration. As shown in FIG. 4A, unit 115-A includes controller 210-A, reader device 240-A, lock device 250-A, sensor 260-A (e.g., a camera), and an actuator 270-A. Unit 115-A may be configured remotely from the location where unit 115-A may be installed. An installer may carry unit 115-A from his workshop to a client's location for installation. Alternatively, unit 115 may come configured to a location for installation through a delivery service, for example.

Figure 4B:
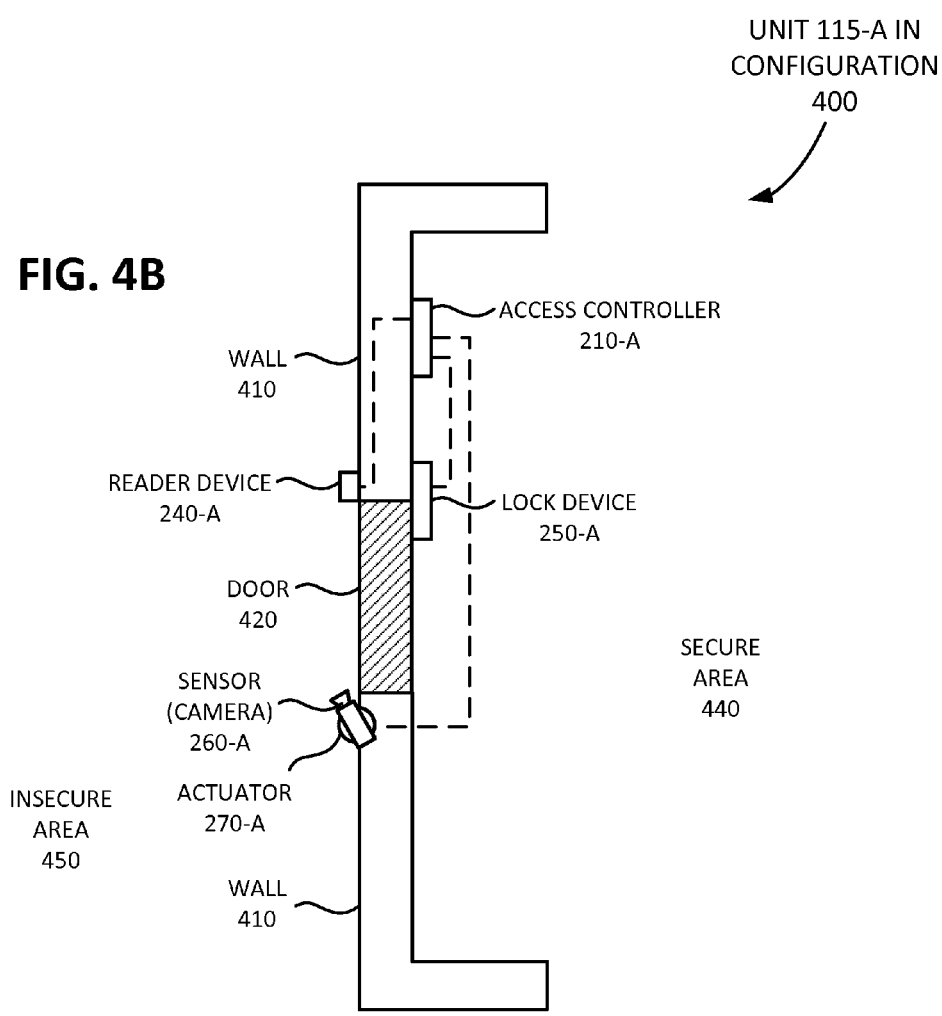
FIG. 4B is a block diagram illustrating the system unit of FIG. 4A in a stand-alone configuration.
Figure 5A:
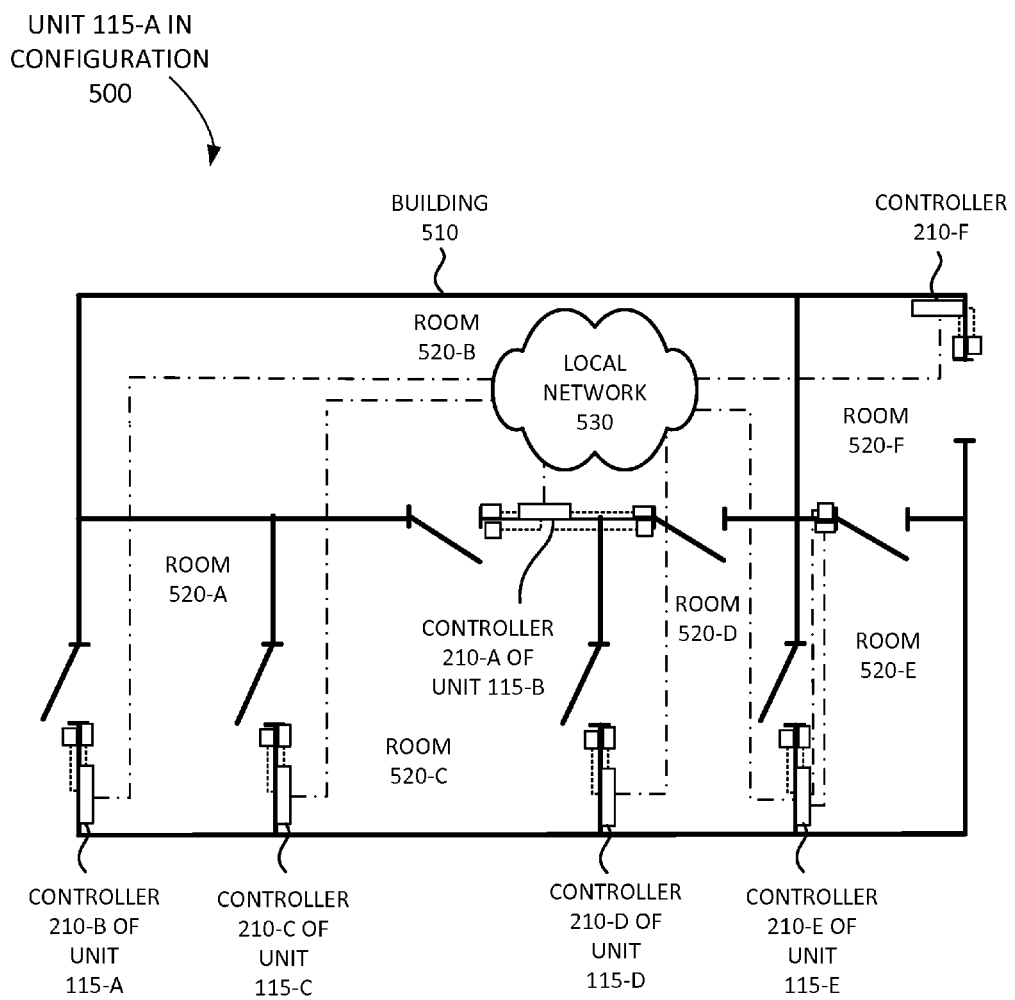
FIGS. 5A through 5C are block diagrams illustrating the system unit of FIG. 4A in a networked configuration.
Figure 5B:
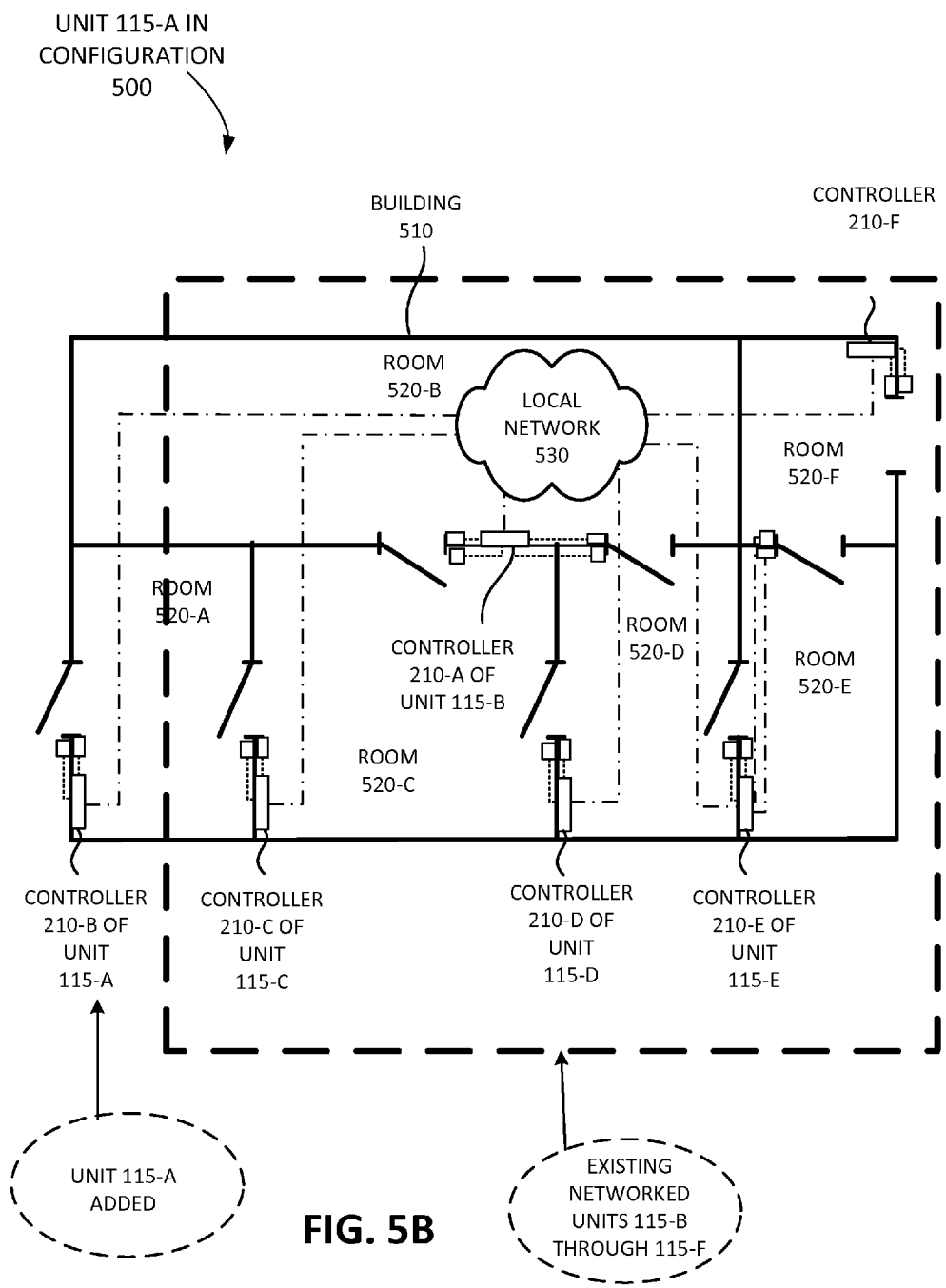
Figure 5C:
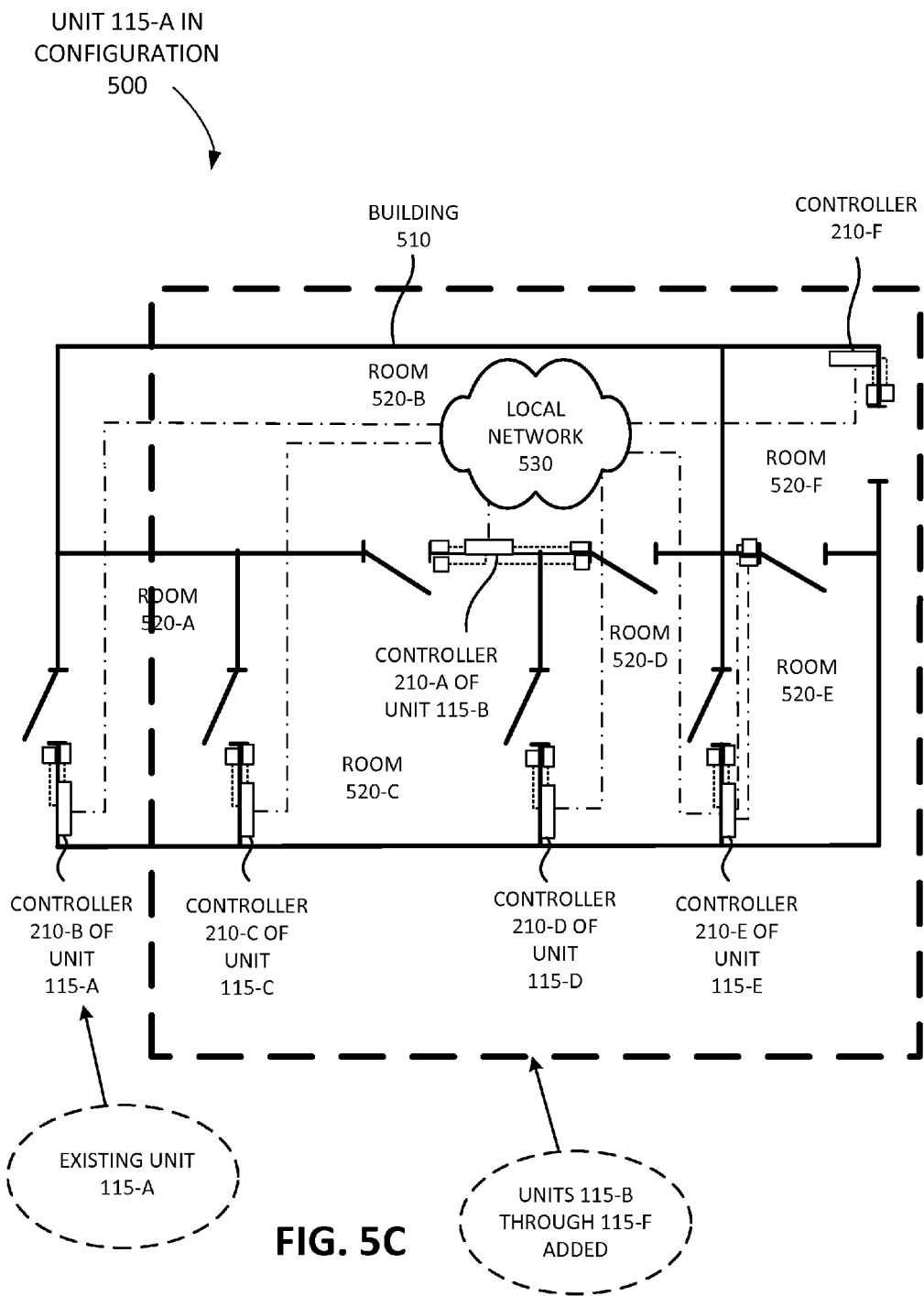

As described below, unit 115-A may be installed as a stand-alone unit (operating by itself in a network of one) or may be installed in a network of other units 115. FIG. 4B is a block diagram illustrating unit 115-A of FIG. 4A in a stand-alone configuration. On the other hand, FIGS. 5A-5C are block diagrams illustrating unit 115-A in a network configuration 500 of other units 115. If unit 115-A is installed in network configuration 500, then unit 115-A may be introduced into an already existing network of other units 115-B through 115-F as shown in FIG. 5B. Alternatively, as shown in FIG. 5C, other units 115-B through 115-F may be added (or joined) to unit 115-A as a stand-alone unit (e.g., as a network of one unit).

FIG. 4B is a block diagram illustrating unit 115-A of FIG. 4A in a stand-alone configuration 400. As shown in FIG. 4B, configuration 400 may includes a wall 410, a door 420 and system unit 115-A. As discussed above, system unit 115-A includes controller 210-A, reader device 240-A, lock device 250-A, sensor 260-A, and actuator 270-A.

Wall 410 encloses a secure area 440, such as a room in a building. Door 420 provides access for a user to secure area 440. In this embodiment, controller 210-A is installed inside secure area 440. In other embodiments, controller 210-A may be installed in an insecure area 450. Reader device 240-A is installed outside secure area 440 and lock device 250-A is installed inside secure area 440 to wall 410 and door 420. Sensor 260-A, in this example, is a monitoring device mounted outside secure area 440 in insecure area 450. Actuator 270-A includes a motor used to control the field of view of the monitoring device in this example.

When a user enters credentials into reader device 240-A (e.g., by entering a PIN, scanning an access card, scanning an iris, etc.), controller 210-A may use the credentials to authenticate the identity of the user and may perform a lookup in an access rules table to determine whether to grant access to the user based on the identity of the user and the access rules. If controller 210-A determines that access should be granted, controller 210-A activates lock device 250-A to unlock door 420, thus granting access to the user to secure area 440.

Although FIG. 4B shows exemplary components of configuration 400, in other implementations, configuration 400 may include fewer components, different components, additional components, or differently arranged components than depicted in FIG. 4B. Additionally or alternatively, any one component (or group of components) in configuration 400 may perform a task or tasks described as performed by one or more other components of configuration 400.

FIGS. 5A-5C are block diagrams illustrating unit 115-A in a network configuration 500 of other units 115-B through 115-F (e.g., rather than the stand-alone configuration 400 in FIG. 4B). As shown in FIG. 5A, configuration 500 may include a building 510 with rooms 520-A through 520-F. A local network 530, such as an Ethernet network, may interconnect system units 115-A through 115-F. This example includes the particular unit 115-A described in FIG. 4A in a different environment: in a network of other units 115-B through 115-F rather than stand-alone. Unit 115-A in FIG. 5A is configured similarly as unit 115-A in FIG. 4A (e.g., including controller 210-A, reader device 240-A, lock device 250-A, sensor 260-A, and actuator 270-A). Unit 115-A could have arrived in this configuration in different ways. For example, as demonstrated in FIG. 5C, unit 115-A may have been a single-unit system to which units 115-B through 115-F were added (or joined) over time. Or, as demonstrated in FIG. 5B, unit 115-A may have been added to (or joined) configuration 500 to an existing network that already included units 115-B through 115-F.

In this example, system unit 115-B controls two doors into room 520-B; system unit 115-A controls an outside door into room 520-A; system unit 115-C controls one door from room 520-A to room 520-C, system unit 115-D controls one door from room 520-C to room 520-D; system unit 115-E controls one door from room 520-D to room 520-E; and unit 520-F controls an outside door into room 520-F.

In this example, system units 115-A to 115-F do not include a central controlling device (e.g., a server) and may include one or more distributed datasets. For example, system units 115-A through 115-F may maintain a distributed credentials table, a distributed access rules table, and/or a distributed events log. Assume that an administrator uses administration device 130 to log into system unit 115-A to add a user and to add credentials associated with the user. The added credentials may be distributed to the other system units 115 that control doors to rooms to which the user has access. If system unit 115-B fails, for example, data collected by system unit 115-B may continue to be available as a result of a distributed events log included in the other system units.

In FIGS. 5A-5C, each unit 115 is associated with a controller 210. Further, in the implementation of FIGS. 5A-5C, each controller 210 is in a different location (e.g., different room 520) than other controllers 210. In other implementations, some controllers 210 and units 115 may be located in different buildings, different geographic regions, different nations, different continents, etc., than other controllers and units 115. Despite their diverse locations, in one embodiment, units 115 and controllers 210 may be able to discover each other (or make a best effort to do so), form a peer-to-peer network, and distribute datasets.

Although FIGS. 5A-5C show exemplary components of configuration 500, in other implementations, configuration 500 may include fewer components, different components, additional components, or differently arranged components than depicted in FIGS. 5A-5C. For example, in another embodiment, a central controlling device (e.g., a server) may be used in conjunction with one or more distributed datasets. Additionally or alternatively, one or more components of configuration 500 may perform one or more tasks described as performed by one or more other components of configuration 500.

Figure 6:
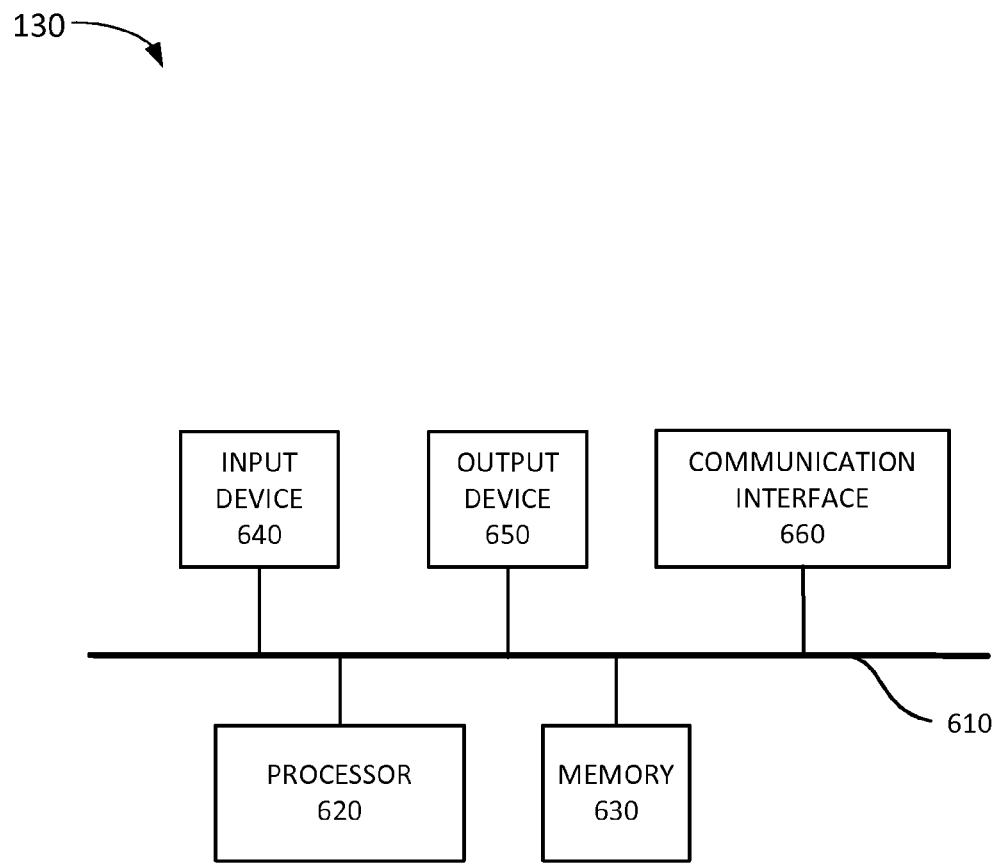
FIG. 6 is a block diagram of exemplary components of the administrative device of FIG. 1.

FIG. 6 is a block diagram illustrating exemplary components of administration device 130. As shown in FIG. 6, administration device 130 may include a bus 610, a processor 620, a memory 630, an input device 640, an output device 650, and a communication interface 660.

Bus 610 includes path that permits communication among the components of administration device 130. Processor 620 may include any type of single-core processor, multi-core processor, microprocessor, latch-based processor, and/or processing logic (or families of processors, microprocessors, and/or processing logics) that interprets and executes instructions. In other embodiments, processor 620 may include an ASIC, an FPGA, and/or another type of integrated circuit or processing logic.

Memory 630 stores information, data, and/or instructions. Memory 630 may include a dynamic, volatile, and/or non-volatile storage device. Memory 630 may store instructions, for execution by processor 620, or information for use by processor 620. For example, memory 620 may include a RAM, a ROM, a CAM, a magnetic and/or optical recording memory device, etc.

Input device 640 allows an operator to input information into administration device 130. Input device 640 may include, for example, a keyboard, a mouse, a pen, a microphone, a touch-screen display, etc. Output device 650 may output information to an operator of administration device 130. Output device 650 may include a display, a printer, a speaker, and/or another type of output device.

Communication interface 660 may include (e.g., a transmitter and/or a receiver) that enables controller 210 to communicate (e.g., transmit and/or receive data) with other devices and/or systems via wired communication links, wireless communication links, or a combination of wireless and wired communication links. Communication interface 660 may include a network interface card (e.g., Ethernet card) for wired communications and/or a wireless network interface (e.g., a WiFi) card for wireless communications.

Administration device 130 may perform operations relating to managing units 115 in system 110. Administration device 130 may perform these operations in response to processor 620 executing software instructions contained in a computer-readable medium, such as memory 630. The software instructions contained in memory 630 may cause processor 620 to perform these operations.

Figure 7:
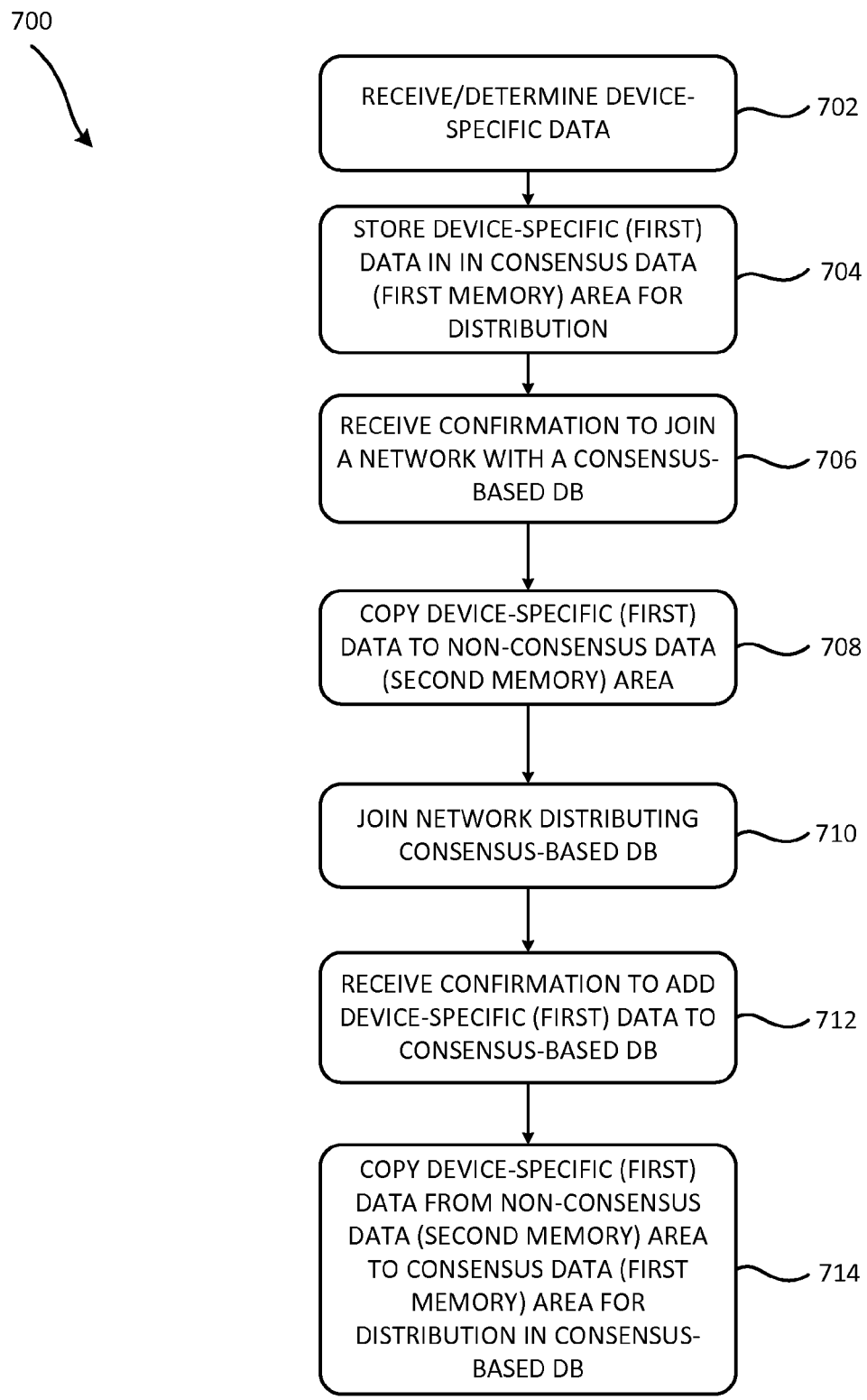
FIG. 7 is a flowchart of an exemplary process for adding the system unit of FIG. 4A to a network of other system units.

FIG. 7 is a flowchart of an exemplary process 700 for adding system unit 115-A (or having system unit 115-A join a network) to create network configuration 500 (e.g., a distributed environment with other units 115-B through 115-F). Process 700 demonstrates the situation in which unit 115-A becomes a stand-alone unit (configuration 400 of FIG. 4B) or a unit in a network configuration (configuration 500 of FIGS. 5A-5C either as a first unit or an added unit). Process 700 may be performed by control logic 322 and/or distribution layer logic 340 running in controller 210, for example.

In this example, process 700 starts with the receipt or determination of device-specific or other data (e.g., configuration data, initial, or first data for a controller 210) (block 702). For example, an administrator using administration device 130 may configure a controller 210-A (shown in FIG. 4A) with reader device 240-A, lock device 250-A, sensor 260-A, actuator 270-A. During configuration (and the generation of the device-specific data), the administrator may not know whether system unit 115-A will be put in configuration 400 (stand-alone, shown in FIG. 4B) or networked configuration 500 (shown in FIG. 5 networked with units 115-B through 115-F). Further, if system unit 115-A is to be in network configuration 500, the administrator may not know whether unit 115-A will be the first unit of the network (the situation shown in FIG. 5C in which case it may be a stand-alone device of configuration 400 to start), or be added to an existing network of units 115-B through 115-F (the situation shown in FIG. 5B).

As such, the device-specific data (e.g., configuration data or first data) may be stored in a first memory area (e.g., consensus data area 360) in a database for distribution to other controllers 210 (or units 115) (block 704). In this example, the device-specific data may be stored as device-specific data 362 of consensus data area 360 in storage layer 350. If unit 115-A is a stand-alone unit, then it is ready to be put in configuration 400 (in a network of one device). Further, unit 115-A is ready to have other units 115 join it to form a larger network of units 115 (the situation of FIG. 5C). In this latter case, the data in consensus data area 360 may be distributed to other controllers as they are added to unit 115-A.

If, on the other hand, system unit 115-A is to join an existing network of units 115-B through 115-F (the situation of FIG. 5B), then confirmation is received to add controller 210-A (unit 115-A) to a new network (e.g., a peer-to-peer network) distributing a consensus-based database (block 706). In this case, care should be taken to avoid removing, deleting, or overwriting device-specific data 362 provided by the administrator at block 702. In other words, if unit 115-A joined units 115-B through 115-F, the system runs the risk of having device-specific data 362 for unit 115-A overwritten because of a lack of consensus. As such, one embodiment allows device-specific data 362 to be introduced to the consensus-based DB distributed by units 115-B through 115-F without being overwritten. In another embodiment, confirmation does not have to be received for system unit 115-A to be added to an existing network.

To safeguard against device-specific (first) data 362 from being overwritten, deleted, or removed from the distributed database, device-specific (first) 362 data may be stored in another (e.g., second) memory area (block 708), such as non-consensus data area 370 (see FIG. 3C). After copying device-specific data 362, unit 115-A (i.e., controller 110-A) may join (or be added to) the new network (block 710) that is distributing the consensus-based database (e.g., the situation of FIG. 5B) among units 115-B through 115-F (e.g., a peer-to-peer network). As part of the new network, unit 115-A (i.e., controller 110-A) may receive data from the other devices (units 115-B through 115-F) in the network (e.g., peer-to-peer network) and may add the received data to the consensus-based data area by storing the received data in the first memory area (i.e., consensus data area 360).

Unit 115-A (e.g., controller 110-A) may receive confirmation to add the device-specific (first) data to the consensus based data (block 712). For example, the administrator adding unit 115-A to the network of configuration 500 may be prompted as to whether the device-specific data should be added to the distributed DB of configuration 500. If so, controller 210-A adds or copies the copy of device specific (first) data 372 from the non-consensus data area 370 (i.e., the second memory area) to consensus data area 360 (e.g., the first memory area) for distribution to the other units 115/controllers 210 in the network formed by units 115-B through 115-F (block 714). As such, system unit 115-A is added to network configuration 500 with its device-specific data 362 kept intact and distributed as appropriate. Distribution layer 340, in this example, distributes the consensus-based data stored in consensus data area 360 (including device-specific data 362). In one embodiment, device-specific data 362 is tagged with a device identifier (ID) (e.g., a unique device identifier) so as to make a lack of consensus with respect to device-specific data unlikely.

Figure 8:
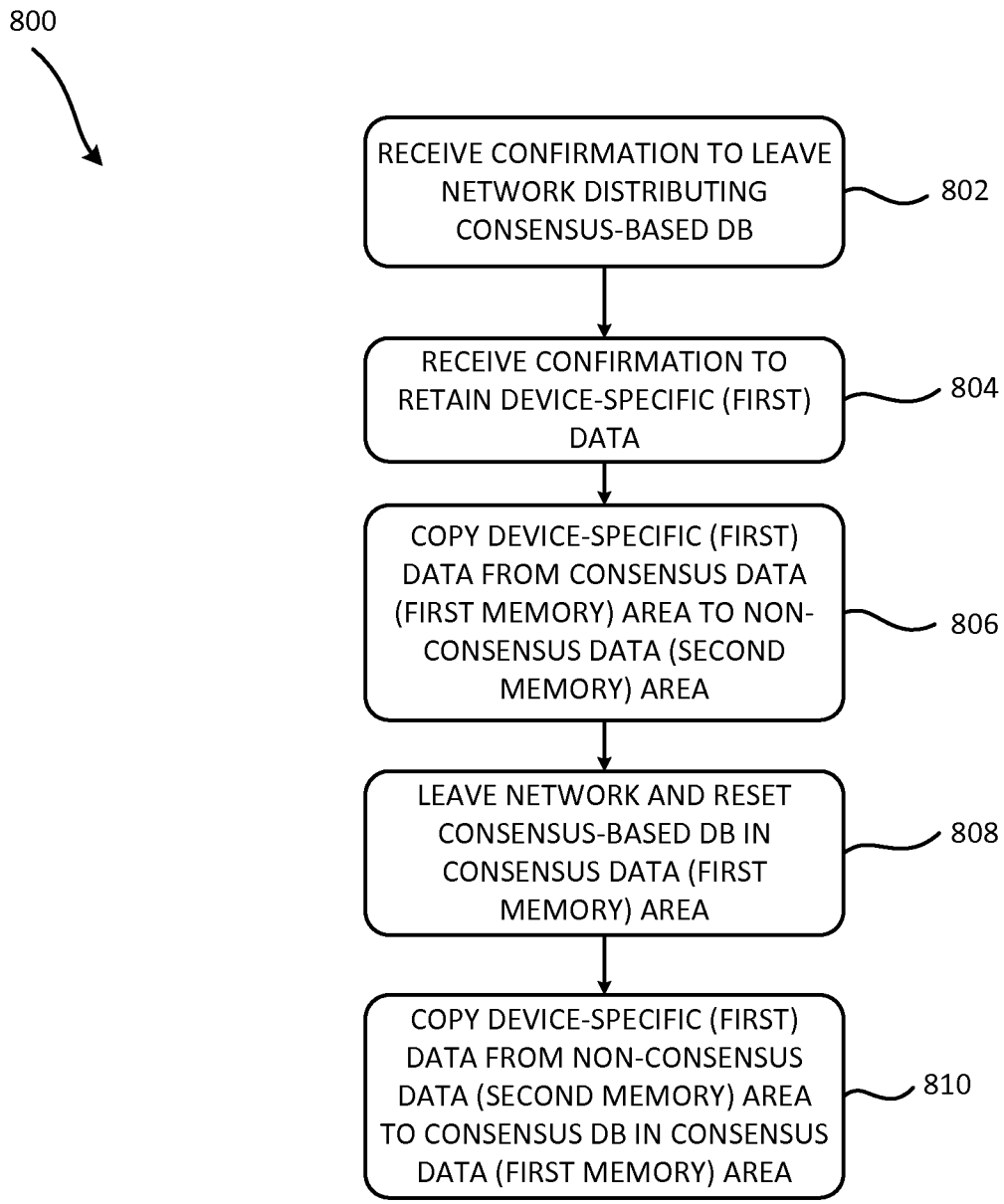
FIG. 8 is a flowchart of an exemplary process for removing the system unit of FIG. 4A from the network of other system units.

After system unit 115-A is part of network configuration 500, an administrator may wish to remove unit 115-A from network configuration 500. After removal, the administrator may want unit 115-A to operate as a stand-alone unit as shown in configuration 400 of FIG. 4. FIG. 8 is a flowchart of an exemplary process 800 for removing unit 115-A from the network configuration 500 shown in FIG. 5A.

Process 800 begins with the receipt of a confirmation that unit 115-A is to be removed from its existing network configuration 500 (block 802) and that the device-specific (first) data for unit 115-A is to be retained (block 804). If device-specific (first) data is to be retained, then the device-specific (first) data is copied to non-consensus data (second memory) area 370 (block 806) (see FIG. 3C) (e.g., from consensus data (first memory) area 360.

System unit 115-A may then leave the network configuration (e.g., be removed from the peer-to-peer network) and the distributed DB may be reset (block 808). Resetting the distributed DB may include resetting consensus data area 360 by erasing or deleting data stored in consensus data area 360. Device-specific data (first) 362 may then be copied from the non-consensus data (second memory) area 370 to consensus data (first memory) area 360 (block 810). In this case, the administrator may take unit 115-A out of network 500, for example, while maintaining its device-specific configuration information (e.g., such as configuration information regarding peripherals connected to controller 210-A).

This application incorporates by reference the following applications filed the same day as the present patent application: U.S. application Ser. No. 14/028,218, titled "Event Timeline Generation"; U.S. application Ser. No. 14/028,118, titled "Control System Configuration Within an Operational Environment"; U.S. application Ser. No. 14/028,236, titled "Anonymous Decisions in an Access Control System"; U.S. application Ser. No. 14/028,243, titled "Consensus Loss in Distributed Control Systems"; U.S. application Ser. No. 14/028,198, titled "Distributed Events in an Access Control System"; U.S. application Ser. No. 14/028,230, titled "Managing Application Data in Distributed Control Systems"; and U.S. application Ser. No. 14/028,208, titled "Distribution of User Credentials". In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 7 and 8, the order of the blocks and/or signal flows may be modified in other implementations. Further, non-dependent blocks and/or signal flows may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises" and/or "comprising," as used herein specify the presence of stated features, integers, steps or components but does not preclude the presence or addition of one or more other features, integers, steps, components or groups thereof. Further, the term "exemplary" (e.g., "exemplary embodiment," "exemplary configuration," etc.) means "as an example" and does not mean "preferred," "best," or likewise.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    storing device-specific data in a first memory area of a particular device,
        wherein the first memory area is designated to store data for a consensus-based distributed database (DB),
        wherein the device-specific data is to be added to the consensus-based distributed DB that is distributed among devices in a peer-to-peer network, wherein the devices in the peer-to-peer network include the particular device and peer devices,
        wherein the consensus-based distributed DB is configured to effect a change in the data stored in the consensus-based distributed DB when consensus to the change is reached by a quorum, wherein the quorum is a number less than a total number of devices in the peer-to-peer network among which the consensus-based distributed DB is distributed, and
        wherein the device-specific data includes data to configure the particular device;
    adding the device to the peer-to-peer network;
    receiving data from one or more of the peer devices and adding the received data to the consensus-based distributed DB by storing the received data in the first memory area;
    retaining the device-specific data in the particular device when adding the particular device to the peer-to-peer network, wherein retaining the device-specific data includes:
        copying the device-specific data to a second memory area of the particular device, and after copying the device-specific to the second memory area of the particular device and after adding the particular device to the peer-to-peer network:
            copying the device-specific data from the second memory area to the first memory area and changing the data stored in the consensus-based distributed DB by adding the device-specific data to the consensus-based distributed DB, and
            distributing, after adding the device-specific data to the consensus-based distributed DB, the device-specific data to the peer devices in the peer-to-peer network as part of the consensus-based distributed DB.

2. The method of claim 1, wherein the second memory area is designated to store data for a non-consensus-based DB.

3. The method of claim 2, wherein the device-specific data includes configuration data to configure a controller in a distributed control system.

4. The method of claim 3, wherein the configuration data includes data that defines peripherals connected to the controller.

5. The method of claim 1, wherein the device includes a controller in a distributed physical access control system (DPACS) and the peer devices include other controllers in the DPACS, and the device-specific data includes data to configure the controller.

6. A method comprising:
    storing a consensus-based distributed database (DB) in a first memory area of a memory in a particular device,
        wherein the particular device is connected to a peer-to-peer network of peer devices that distributes the consensus-based distributed DB among devices in the peer-to-peer network, wherein the devices in the peer-to-peer network include the particular device and peer devices,
        wherein the consensus-based distributed DB is configured to effect a change in the data stored in the consensus-based distributed DB when consensus to the change is reached by a quorum, wherein the quorum is a number less than a total number of devices in the peer-to-peer network among which the consensus-based distributed DB is distributed, and wherein the consensus-based distributed DB stores device-specific data to configure the particular device;

retaining the device-specific data in the particular device when removing the particular device from the peer-to-peer network, wherein retaining the device-specific data includes:

copying the device-specific data to a second memory area of the particular device;

removing the particular device from the peer-to-peer network after copying the device-specific data to the second memory area;

deleting data in the consensus-based distributed DB after copying the device-specific data to the second memory area and after removing the particular device from the peer-to-peer network; and copying the device-specific data from the second memory area to the first memory area and changing the data stored in the consensus-based distributed DB by adding the device-specific data to the consensus-based distributed DB after deleting the data in the consensus-based distributed DB.

7. The method of claim 6, wherein the second memory area is designated to store data for a non-consensus-based DB.

8. The method of claim 7, wherein the device-specific data includes configuration data to configure a controller in a distributed control system.

9. The method of claim 8, wherein the configuration data defines peripherals connected to the particular device.

10. The method of claim 6, wherein the particular device is a controller in a distributed physical access control system (DPACS), and wherein the peer devices include other controllers in the DPACS.

11. A device comprising:
a first memory area of the device to store device-specific data for a consensus-based distributed database (DB), wherein the device-specific data is to be added to the consensus-based distributed DB that is distributed among devices in a peer-to-peer network, wherein the devices in the peer-to-peer network include the particular device and peer devices,
wherein the consensus-based distributed DB is configured to effect a change in the data stored in the consensus-based distributed DB when consensus to the change is reached by a quorum, wherein the quorum is a number less than a total number of devices in the peer-to-peer network among which the consensus-based distributed DB is distributed, and
wherein the device-specific data is for configuring the device;
a processor to add the device to the peer-to-peer network;
a receiver to receive data from the peer devices in the peer-to-peer network, wherein the processor is configured to store the received data in the first memory area and add the received data to the consensus-based distributed DB, and
wherein the processor is also configured to retain the device-specific data in the device when adding the device to the peer-to-peer network, wherein the processor is configured to:
copy the device-specific data to a second memory area of the device, and after copying the device-specific to the second memory area of the device and after adding the device to the peer-to-peer network, the processor is configured to:
copy the device-specific data from the second memory area to the first memory area, and change the data stored in the consensus-based distributed DB by adding the device-specific data to the consensus-based distributed DB after adding the device to the peer-to-peer network; and
a transmitter to transmit the device-specific data to the peer devices in the peer-to-peer network as part of the consensus-based distributed DB.

12. The device of claim 11, wherein the second memory area is designated to store data for a non-consensus-based DB.

13. The device of claim 12, wherein the device-specific data includes configuration data to configure a controller in a distributed control system.

14. The device of claim 13, wherein the configuration data defines peripherals connected to the controller.

15. The device of claim 14, further comprising a controller in a distributed physical access control system (DPACS) and the peer devices comprise other controllers in the DPACS.

16. A device including:
a first memory area in the device to store a consensus-based distributed database (DB),
wherein the device is connected to a peer-to-peer network that distributes the consensus-based distributed DB among devices in the peer-to-peer network, wherein the devices in the peer-to-peer network include the device and peer devices,
wherein the consensus-based distributed DB is configured to effect a change in the data stored in the consensus-based distributed DB when consensus to the change is reached by a quorum, wherein the quorum is a number less than a total number of devices in the peer-to-peer network among which the consensus-based distributed DB is distributed, and
wherein the consensus-based distributed DB stores device-specific data for configuring the device;
a processor to retain the device-specific data in the device when the device is removed from the peer-to-peer network, wherein the processor is configured to:
copy the device-specific data, stored in the consensus-based distributed DB, to a second memory area of the device,
remove the device from the peer-to-peer network after copying the device-specific data to the second memory area,
delete data in the consensus-based distributed DB after copying the device-specific data to the second memory area and after removing the device from the peer-to-peer network; and
copy the device-specific data from the second memory area to the first memory area and change the data stored in the consensus-based distributed DB by adding the device-specific data to the consensus-based distributed DB after deleting the data in the consensus-based distributed DB.

17. The device of claim 16, wherein the second memory area is designated to store data for a non-consensus-based DB.

18. The device of claim 17, wherein the device-specific data includes configuration data to configure a controller in a distributed control system.

19. The device of claim 18, wherein the configuration data defines peripherals connected to the controller.

20. The device of claim 19, further comprising a controller in a distributed physical access control system (DPACS), wherein the peer devices comprise other controllers in the DPACS.

* * * * *

UNITED STATES PATENT AND TRADEMARK OFFICE
CERTIFICATE OF CORRECTION

PATENT NO. : 9,621,644 B2
APPLICATION NO. : 14/028059
DATED : April 11, 2017
INVENTOR(S) : Mathias Bruce Page 1 of 1

It is certified that error appears in the above-identified patent and that said Letters Patent is hereby corrected as shown below:

In the Claims

Claim 6, at Column 16, Line 57 delete the phrase "of a memory"

Signed and Sealed this
Thirty-first Day of October, 2017

Joseph Matal
*Performing the Functions and Duties of the
Under Secretary of Commerce for Intellectual Property and
Director of the United States Patent and Trademark Office*